US009896032B2

(12) United States Patent
Dudar

(10) Patent No.: US 9,896,032 B2
(45) Date of Patent: Feb. 20, 2018

(54) FOLDING MIRROR APPARATUS AND METHOD FOR IMPROVING FUEL EFFICIENCY

(71) Applicant: FORD GLOBAL TECHNOLOGIES, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/137,530

(22) Filed: Apr. 25, 2016

(65) Prior Publication Data

US 2017/0305351 A1 Oct. 26, 2017

(51) Int. Cl.
| | | |
|---|---|---|
| *B60R 21/01* | (2006.01) | |
| *B60R 1/062* | (2006.01) | |
| *B60R 1/12* | (2006.01) | |
| *B62D 35/00* | (2006.01) | |

(52) U.S. Cl.
CPC ............ *B60R 1/062* (2013.01); *B60R 1/12* (2013.01); *B62D 35/00* (2013.01); *B60R 2001/1223* (2013.01)

(58) Field of Classification Search
CPC ... B60R 1/062; B60R 1/12; B60R 2001/1223; B60R 21/01; B60R 1/006; B62D 35/00
See application file for complete search history.

(56) References Cited

U.S. PATENT DOCUMENTS

| 5,179,470 A * | 1/1993 | Olson ................ B60R 1/06 359/507 |
|---|---|---|
| 6,204,753 B1 | 3/2001 | Schenk et al. |
| 7,342,484 B2 * | 3/2008 | Lang ............... B60Q 1/2665 340/426.25 |
| 9,358,927 B2 * | 6/2016 | Haeussler ........... B60R 1/006 |
| 2014/0327775 A1 | 11/2014 | Cho |
| 2015/0226146 A1 | 8/2015 | Elwart et al. |
| 2015/0253536 A1 | 9/2015 | Le et al. |

FOREIGN PATENT DOCUMENTS

| DE | 102013012750 B4 | 2/2015 |
|---|---|---|
| KR | 1356538 B1 | 2/2014 |
| WO | 2015010270 A1 | 1/2015 |

OTHER PUBLICATIONS

Heywood, Assessing the fuel consumption and GHG of future in-use vehicles, 2010, IEEE, p. 1-14.*
English Machine Translation of DE102013012750B4.
English Machine Translation of KR1356538B1.
English Machine Translation of WO2015010270A1.

* cited by examiner

*Primary Examiner* — McDieunel Marc
(74) *Attorney, Agent, or Firm* — Jason Rogers; King & Schickli, PLLC

(57) ABSTRACT

A folding mirror apparatus and related method are provided for improving the fuel efficiency of a motor vehicle. That folding mirror apparatus includes a first exterior mirror, a second exterior mirror and a sensor array for monitoring an area around the motor vehicle. Further, the apparatus includes a control module that is configured to receive data from the sensor array and displace the exterior mirrors into a stowed, more aerodynamic position when no obstacles are detected in the area being monitored.

15 Claims, 4 Drawing Sheets

FOLDING MIRROR APPARATUS AND METHOD FOR IMPROVING FUEL EFFICIENCY

TECHNICAL FIELD

This document relates generally to the motor vehicle equipment field and, more particularly, to an apparatus and method for improving the fuel efficiency of a motor vehicle by folding the exterior side mirrors into a stowed, aerodynamically advantageous position when they are not needed to safely drive the motor vehicle.

BACKGROUND

Exterior side mirrors are mandated by the government to be installed on the right and left side of a motor vehicle so that drivers can better view any obstacles in adjacent lanes. While very useful for this intended purpose, it should be appreciated that exterior side mirrors create substantial drag and the resulting aerodynamic inefficiency reduces the fuel economy of the motor vehicle.

This document relates to a new and improved folding mirror apparatus and method that function to improve the fuel efficiency of the motor vehicle while allowing for safe operation. This is true whether the motor vehicle is a non-autonomous motor vehicle or an autonomous motor vehicle being driven in manual mode, semi autonomous mode or even full autonomous mode.

SUMMARY

In accordance with the purposes and benefits described herein, an apparatus is provided for improving the fuel efficiency of a motor vehicle. That apparatus comprises a first exterior mirror, a second exterior mirror and a sensor array monitoring an area around the motor vehicle. Further, the apparatus includes a control module. That control module includes a controller that is configured to receive data from the sensor array and to displace the first exterior mirror and the second exterior mirror into a stowed, more aerodynamic, position when no obstacles are detected in the area. Further, the controller is configured to displace the first exterior mirror and the second exterior mirror into a deployed, viewing position when an obstacle is detected in the area.

Thus, the exterior side mirrors are made available for viewing when the presence of obstacles/traffic dictates their use for safe operation of the motor vehicle. However, the exterior side mirrors are stowed into an aerodynamic position when they are not needed for the safe operation of the motor vehicle so as to improve the aerodynamics of the motor vehicle and the resulting fuel efficiency at which the motor vehicle operates. This reduces the overall operating cost of the motor vehicle.

The control module of the apparatus may further include a first actuator for displacing the first exterior mirror between the stowed position and the deployed position. Further, the control module may further include a second actuator for displacing the second exterior mirror between the stowed position and the deployed position.

In one possible embodiment of the apparatus, the area monitored by the sensor array extends in an arc from a left side of the motor vehicle, behind the motor vehicle to a right side of the motor vehicle. In another possible embodiment the area extends in an arc 360° around the motor vehicle.

The sensor array may comprise a plurality of sensor devices selected from a group consisting of a video imaging device, an infrared sensing device, a proximity sensor, a sonar device, a camera and combinations thereof. Those plurality of sensor devices may be located around the motor vehicle. In one possible embodiment the plurality of sensor devices are located at a first corner of the motor vehicle, a second corner of the motor vehicle, a third corner of the motor vehicle, a fourth corner of the motor vehicle, a center rear position, a center front position, a center right side position and a center left side position.

In accordance with an additional aspect, a method is provided for improving the fuel efficiency of a motor vehicle. That method comprises the steps of: (a) monitoring, by a sensor array, an area around the motor vehicle, (b) determining, by the sensor array, if an obstacle is present in the area, (c) displacing, by a control module, an exterior mirror into an aerodynamic stowed position when no obstacle is present in the area and (d) displacing, by the control module, the exterior mirror into a deployed, viewing position when an obstacle is present in the area.

Thus, the method may further include the step of improving aerodynamics and fuel economy of the motor vehicle when the exterior mirror is displaced into the stowed position.

In addition, the method may include the step of configuring a controller of the control module to receive data from the sensor array. Further the method may include the stop of configuring that controller to displace the exterior mirror into the aerodynamic stowed position when no obstacle is detected in the area. Still further, the method may include configuring the controller to displace the exterior mirror into the deployed viewing position when an obstacle is detected in the area.

Still further the method may include the step of defining the area as an arc extending from a left side of the motor vehicle, behind the motor vehicle to a right side of the motor vehicle. Alternatively, the method may include the step of defining the area as an arc extending 360° around the motor vehicle.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof. In the drawing figures.

Reference will now be made in detail to the present preferred embodiments of the apparatus and method, examples of which are illustrated in the accompanying drawing figures.

DETAILED DESCRIPTION

Figure 1:
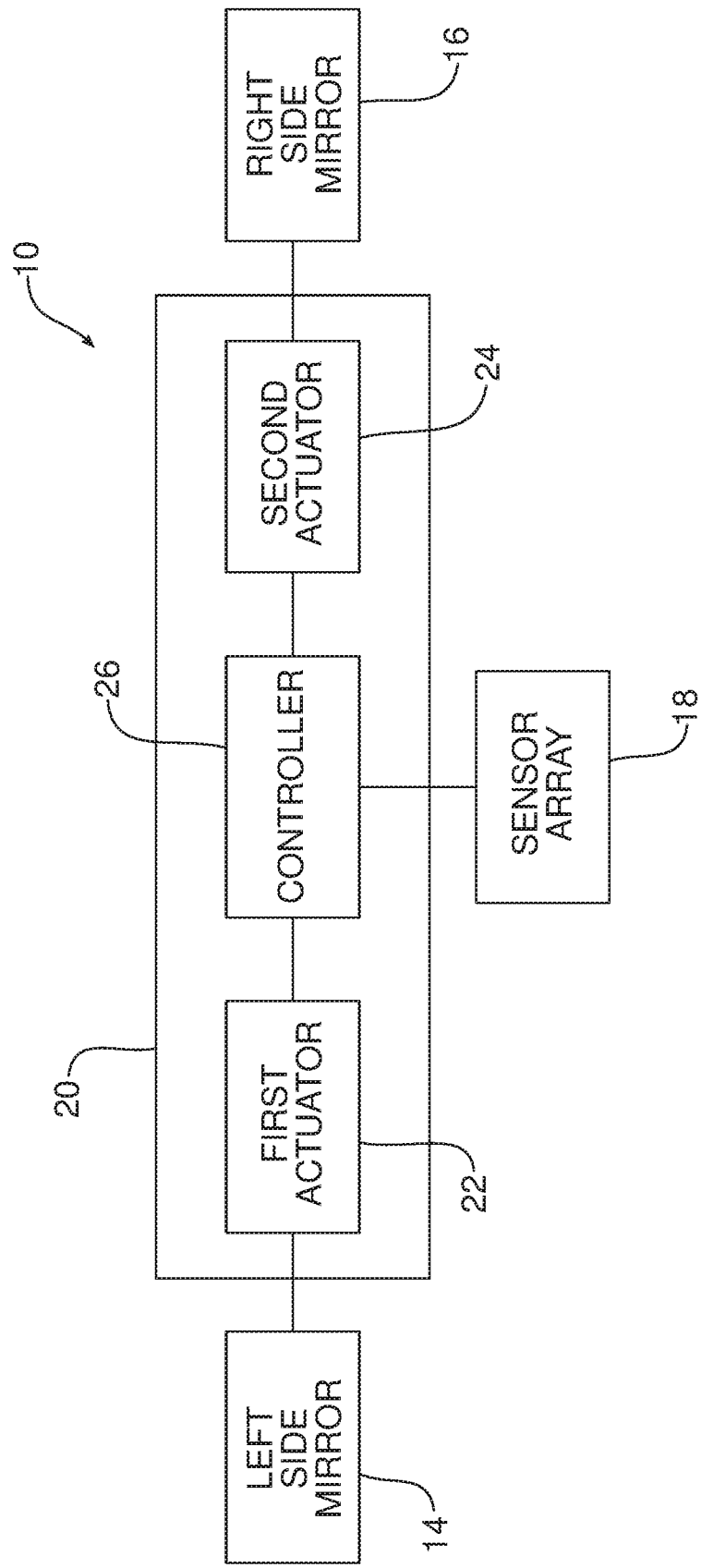
FIG. 1 is a schematic block diagram of the apparatus including the exterior left side mirror, the exterior right side mirror, the sensor array and a control module.
Figure 2:
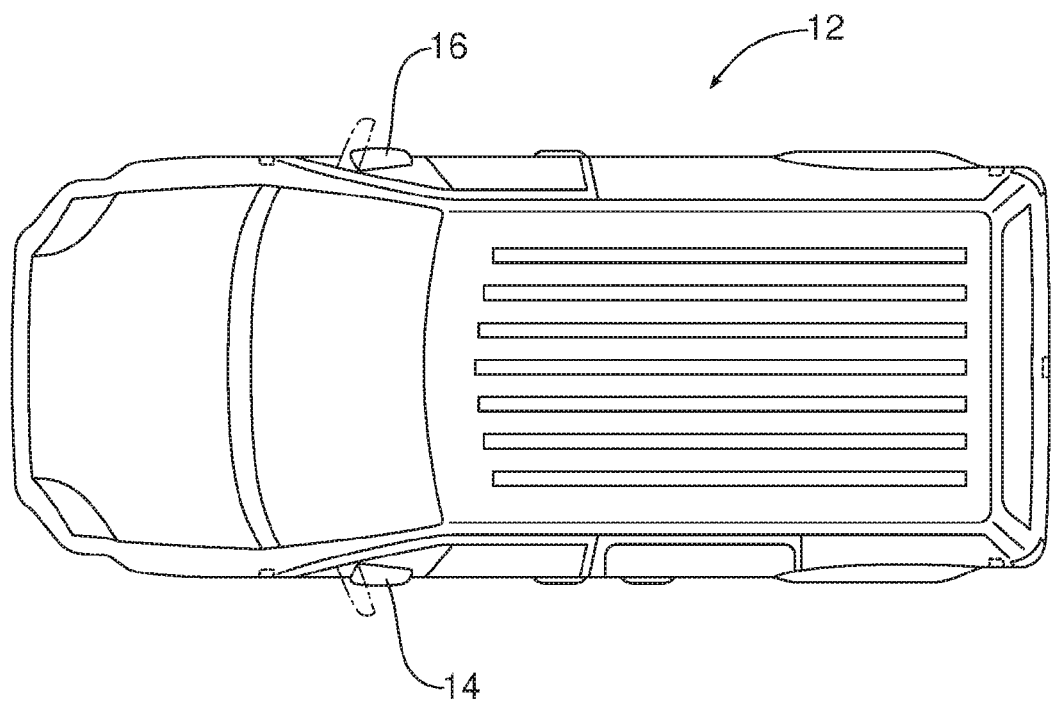
FIG. 2 is a detailed top plan view illustrating the two exterior side mirrors in a deployed position in phantom line and in a retracted position in full line.
Figure 3:
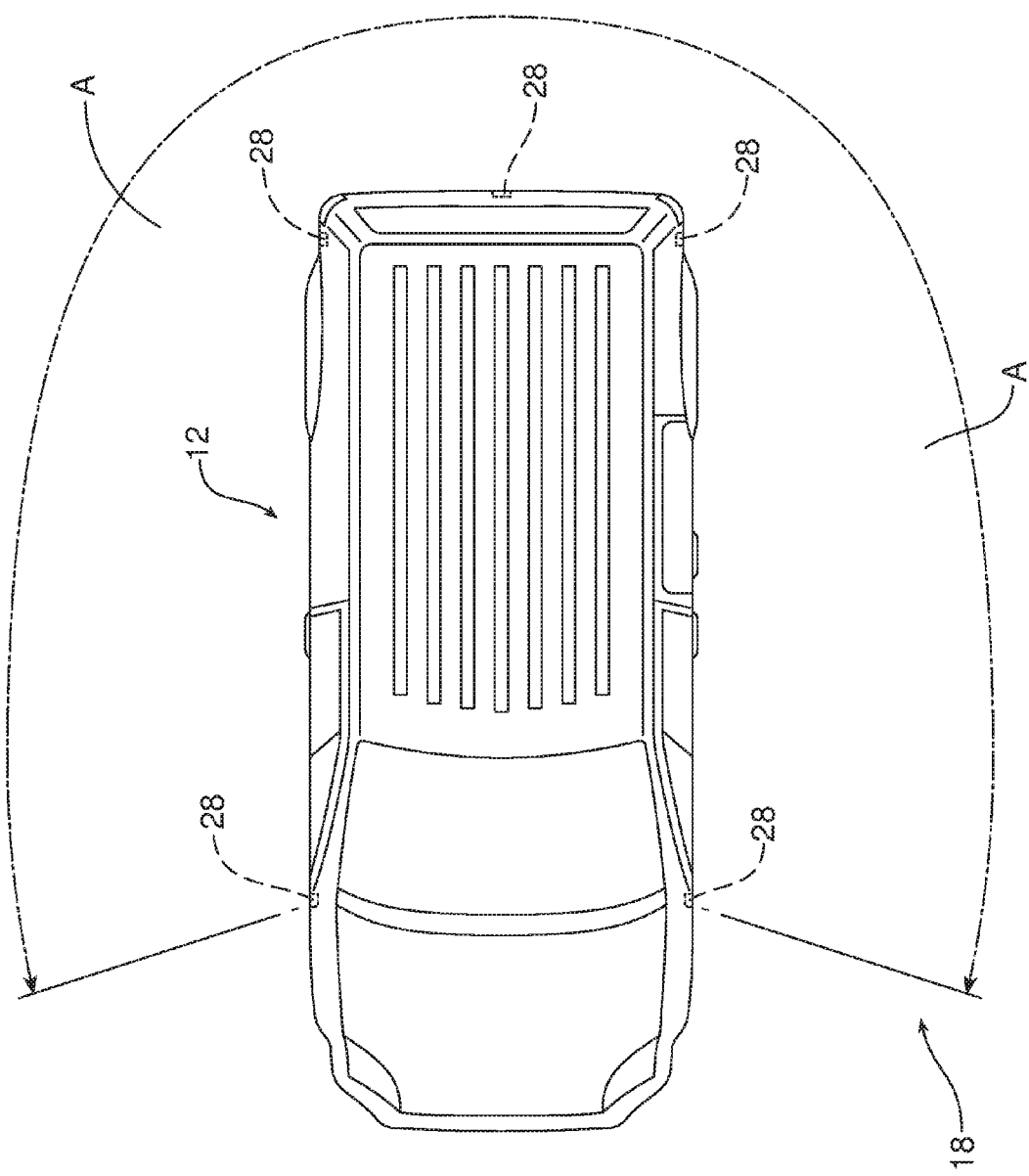
FIG. 3 is a schematic top plan view of the motor vehicle illustrating one possible embodiment of the apparatus wherein the area being monitored by the sensor array extends in an arc from the left side of the motor vehicle, behind the motor vehicle to the right side of the motor vehicle.

Reference is now made to FIGS. 1-3 illustrating a folding mirror apparatus 10 for improving the fuel efficiency of a motor vehicle 12. As illustrated in FIG. 1, that apparatus 10 comprises a first or exterior left side mirror 14, a second or exterior right side mirror 16, a sensor array 18 for monitoring an area A around the motor vehicle 12 and a control module 20.

As illustrated in FIG. 1, the control module 20 includes a first actuator 22 for displacing the first or exterior left side mirror 14 between an aerodynamic, stowed position illustrated in full line in FIG. 2 and a deployed, viewing position illustrated in phantom line in FIG. 2. In addition, the control module 20 includes a second actuator 24 for displacing the second or exterior right side mirror 16 between stowed and deployed positions as also illustrated in FIG. 2.

In addition, the control module 20 also includes a controller 26. The controller 26 may comprise a computing device such as dedicated microprocessor or electronic control unit (ECU) operating in accordance with appropriate instructions provided by control software. Thus, the controller 26 may have one or more processors, one or more memories, one or more network interfaces all in communication with each other over a communication bus. Further, it should be appreciated that the controller 26 may be connected by a communication bus to other control modules including, for example, a body control module or BCM (not shown). As is known in the art, a BCM may comprise a computing device having one or more processors, one or more memories, one or more network interfaces, a human interface, a GPS/geolocator component, a display device such as a multi-function display with touch screen capability and a speech processor that all communicate with each other over a communication bus. The BCM may perform a number of interior body electrically based functions including, for example, interior locking, remote key entry, interior lighting, exterior lighting, windshield wiper control and the like. In some embodiments the BCM may also function to control entertainment functions (e.g. radio, CD player and communications such as telephone and internet communications over a wireless network).

In any of the embodiments, the controller 26 of the control module 20 is configured to receive data from the sensor array 18 and to displace the first and second exterior side mirrors 14, 16 into the stowed, aerodynamically enhanced position when no obstacles are detected in the area A around the motor vehicle 12 being monitored by the sensor array. Further, the controller 26 may be configured to displace the first and second exterior mirrors 14, 16 into the deployed or viewing position when an obstacle is detected by the sensor array 18 in the area A around the motor vehicle 12. In one possible embodiment, the controller 26 may be configured to independently displace the two exterior side mirrors 14, 16. Thus, when an obstacle is detected by the sensor array 18 in the lane to the exterior left side of the motor vehicle 12, the left side mirror 14 may be displaced into the deployed position so that the driver may monitor that obstacle or vehicle in the mirror. Similarly, when an obstacle is detected by the sensor array 18 in the lane to the right side of the motor vehicle 12, the exterior right side mirror 16 may be displaced to the deployed position so that the driver may monitor that obstacle or vehicle in the mirror. Of course, the exterior side mirrors 14, 16 may be independently returned to the stowed position when the lanes on either side of the motor vehicle 12 are clear.

As should be appreciated from viewing FIG. 3, the sensor array 18 may comprise a plurality of sensor devices 28. Those sensor devices 28 may be selected from a non-limiting group of sensor devices consisting of a video imaging device, an infrared sensing device, a proximity sensor, a sonar device, a video camera and combinations thereof. Those sensor devices 28 are located around the motor vehicle 12. In the embodiment illustrated in FIG. 3, the sensor array 18 comprises five sensor devices 28 including one at the left side, one at the left rear corner, one at the center rear, one at the right rear corner and one at the right side of the motor vehicle. Together, the sensor devices 28 of the sensor array 18 illustrated in FIG. 3 function to monitor the area A defined by an arc extending from the left side of the motor vehicle, behind the motor vehicle to the right side of the motor vehicle.

Figure 4:
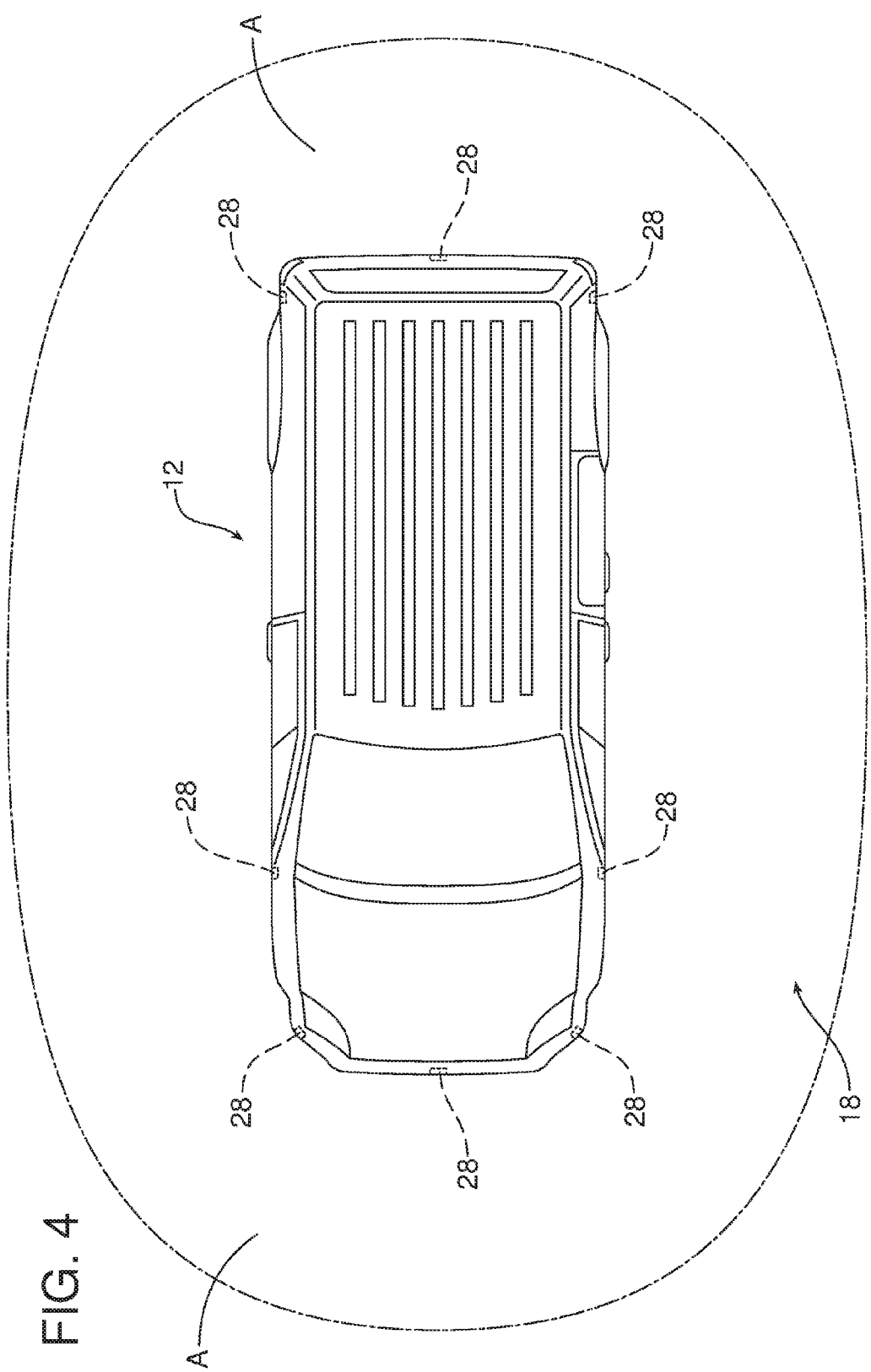
FIG. 4 is a view similar to FIG. 3 illustrating an alternative embodiment of the apparatus wherein the area being monitored by the sensor array extends 360° around the motor vehicle.

Reference is now made to FIG. 4 illustrating an alternative embodiment wherein the sensor array 18 comprises the plurality of sensors 28 including one at each of the following positions: center front, left front corner, left side center, left rear corner, center rear, right rear corner, right side center and right front corner of the motor vehicle 12. Such a sensor array 18 monitors an area A extending a full 360° around the motor vehicle 12.

Consistent with the above description, a method is provided for improving the fuel efficiency of the motor vehicle 12. That method comprises monitoring, by the sensor array 18, the area A around the motor vehicle 12. Further the method includes determining, by the sensor array 18, if an obstacle is present in the area A. Further, the method includes displacing, by the control module 20 an exterior side mirror 14 or 16 into the stowed position when no obstacle is present in the area A and displacing, by the control module, the exterior side mirror into a deployed position when an obstacle is present in the area. Since the stowed position of the rear view mirror 14 or 16 is more aerodynamic than the deployed, viewing position, the method also includes the step of improving the aerodynamic efficiency and fuel economy of the motor vehicle 12 when the exterior side mirror 14 or 16 is displaced into the stowed position.

As should be appreciated from the above description, the method also may include the steps of configuring the controller 26 to (a) receive data from the sensor array 18, (b) displace the exterior side mirror 14 and 16 into the aerodynamic, stowed position when no obstacle is detected in the area A and (c) displace the exterior mirror into the deployed, viewing position when an obstacle is detected in the area. In other words, when there are no obstacles or other vehicles in the monitored area A around the motor vehicle 12, the exterior side mirrors 14, 16 are stowed into an aerodynamic position to increase the fuel economy of the motor vehicle without any detriment to driver safety. In contrast, when an obstacle or motor vehicle is detected in the monitored area A, the exterior side mirrors 14, 16 are deployed into the viewing position to allow the motor vehicle operator to visually determine if clearance exists in adjacent lanes to allow for a safe lane change thereby insuring the safe operation of the motor vehicle 12 in traffic at all times.

Consistent with this purpose, the method may also include the step of defining the area A being monitored by the sensor array 18 as an arc extending from a left side of the motor vehicle, behind the motor vehicle to a right side of the motor vehicle as illustrate in FIG. 3. Alternatively, the method may include the step of defining that area A as an arc extending 360° around the motor vehicle 12 as illustrated in FIG. 4.

The foregoing has been presented for purposes of illustration and description. It is not intended to be exhaustive or to limit the embodiments to the precise form disclosed. Obvious modifications and variations are possible in light of the above teachings. For example, the types of sensor devices 28 may be different than those described above. Similarly, the position of the sensor devices 28 on the motor vehicle 12 may be different than those indicated. All such modifications and variations are within the scope of the appended claims when interpreted in accordance with the breadth to which they are fairly, legally and equitably entitled.

What is claimed:

1. An apparatus for improving a fuel efficiency of a motor vehicle, comprising:
    a first exterior mirror;
    a second exterior mirror;
    a sensor array monitoring an area around said motor vehicle; and
    a control module including a controller configured to receive data from said sensor array and to displace said first exterior mirror and said second exterior mirror into a stowed position when no obstacles are detected in said area and a deployed position when an obstacle is detected in said area, wherein said stowed position is more aerodynamic than said deployed position to improve the fuel efficiency of the motor vehicle.

2. The apparatus of claim 1, wherein said control module further includes a first actuator for displacing said first exterior mirror between said stowed position and said deployed position.

3. The apparatus of claim 2, wherein said control module further includes a second actuator for displacing said second exterior mirror between said stowed position and said deployed position.

4. The apparatus of claim 3, wherein said area extends from a left side of said motor vehicle behind said motor vehicle to a right side of said motor vehicle.

5. The apparatus of claim 3, wherein said area extends 360° around said motor vehicle.

6. A method of improving a fuel efficiency of a motor vehicle, comprising:
    monitoring, by a sensor array, an area around said motor vehicle;
    determining, by said sensor array, if an obstacle is present in said area;
    displacing, by a control module, an exterior mirror into an aerodynamic stowed position when no obstacle is present in said area;
    displacing, by said control module, said exterior mirror into a deployed, viewing position when an obstacle is present in said area; and improving aerodynamics and the fuel efficiency of said motor vehicle when said exterior mirror is displaced into said stowed position.

7. The method of claim 6, including configuring a controller of said control module to receive data from said sensor array.

8. The method of claim 7, including configuring said controller to displace said exterior mirror into said aerodynamic stowed position when no obstacle is detected in said area.

9. The method of claim 8, including configuring said controller to displace said exterior mirror into said deployed viewing position when an obstacle is detected in said area.

10. The method of claim 9, including defining said area as an arc extending from a left side of said motor vehicle, behind said motor vehicle to a right side of said motor vehicle.

11. The method of claim 9, including defining said area as an arc extending 360° around said motor vehicle.

12. The method of claim 6, including independently displacing, by said control module, said exterior mirror on a left side of said motor vehicle into a deployed viewing position when an obstacle is present adjacent said left side of said motor vehicle and independently displacing, by said control module, a second exterior mirror on a right side of said motor vehicle into a deployed viewing position when an obstacle is present adjacent said right side of said motor vehicle.

13. A apparatus for improving a fuel efficiency of a motor vehicle, comprising:
    a first exterior mirror;
    a second exterior mirror;
    a sensor array monitoring an area around said motor vehicle, wherein said sensor array includes a plurality of sensor devices selected from a group consisting of a video imaging device, an infrared sensing device, a proximity sensor, a sonar device, a video camera and combinations thereof; and
    a control module including a controller configured to receive data from said sensor array and to displace said first exterior mirror and said second exterior mirror into a stowed position when no obstacles are detected in said area and a deployed position when an obstacle is detected in said area, wherein said stowed position is more aerodynamic than said deployed position to improve the fuel efficiency of the motor vehicle, and wherein said control module further includes a first actuator and a second actuator for displacing said first exterior mirror between said stowed position and said deployed position.

14. The apparatus of claim 13, wherein said plurality of sensor devices are located around said motor vehicle.

15. The apparatus of claim 14, wherein said plurality of sensor devices are located at a first corner of said motor vehicle, a second corner of said motor vehicle, a third corner of said motor vehicle, a fourth corner of said motor vehicle, a center rear position, a center front position, a center right side position and a center left side position.

* * * * *